Jan. 31, 1928.
N. U. PERIS
1,657,841
HYDRAULIC, STEAM, OR AIR VALVE
Filed April 3, 1926
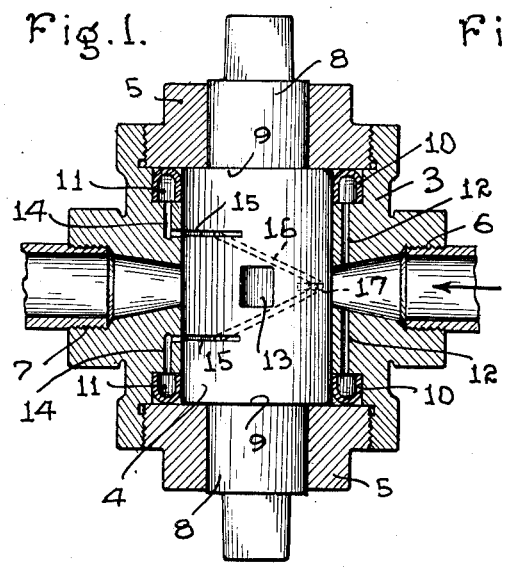
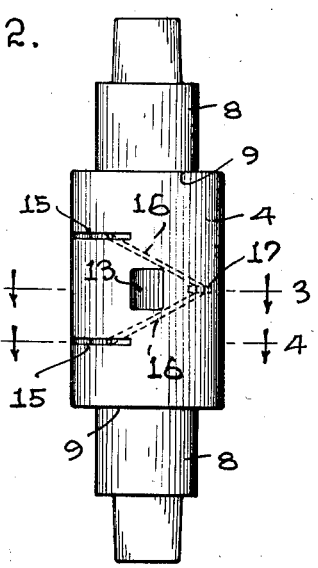
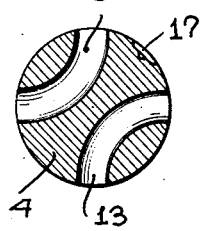
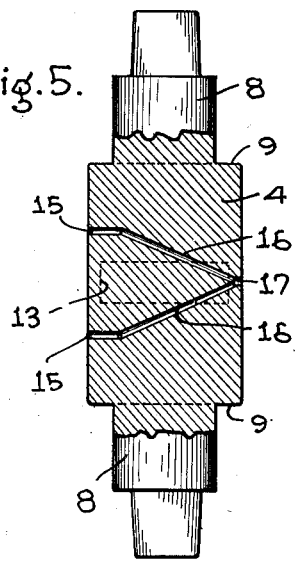
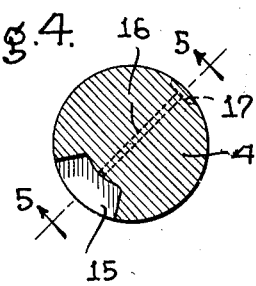
Nicholas U. Peris, Inventor
By _____ Attorney Patented Jan. 31, 1928.

1,657,841

UNITED STATES PATENT OFFICE.

NICHOLAS U. PERIS, OF FLORIN, PENNSYLVANIA.

HYDRAULIC, STEAM, OR AIR VALVE.

Application filed April 3, 1926. Serial No. 99,668.

The present invention relates to valves of the steam, air, or hydraulic type and consists in the combinations and arrangements of elements hereinafter described and particularly set forth in the accompanying claims.

The purpose of the invention is to provide a valve having means for utilizing fluid pressure from the inlet side to obtain an easy working valve, one free from binding to cause uneven wear, and wherein the usual wearing of the working parts will not cause leaking of the valve.

The invention has for its purpose to provide a valve having oppositely disposed packings expansible under the fluid pressure from the inlet side of the valve to form fluid-tight joints for the turning plug for the purpose of obtaining a perfectly balanced valve, and one wherein any tendency to leakage along the turning plug will be neutralized through the counterpressure in the packing chambers.

The construction of valve disclosed herein is proposed as an improvement over the type of valve shown in my U. S. patent on hydraulic, steam, or air valve, No. 1,252,490, dated January 8, 1918, and is characterized in that the expansible packing elements for the turning plug are provided with means for causing the expansible medium to flow or have returned communication with the source of pressure to the end of obtaining a more perfect balance and consequent ease of operation of the turning plug.

The invention is shown by way of illustration in the accompanying drawings, wherein:

Figure 1 is a central sectional view of the valve with the turning plug in elevation;

Figure 2, an elevational view of the turning plug per se;

Figure 3, a transverse sectional view of the turning plug taken on the line 3—3 of Figure 2;

Figure 4, a view similar to Figure 3 taken on the line 4—4 of Figure 2; and

Figure 5, a central sectional view of the turning plug showing the relief ducts or channels for the pressure medium.

Referring to the construction in further detail the valve consists of a casing 3 constructed to provide a central chamber for the turning plug 4, and a pair of opposed bronze glands or nuts 5 screw-threaded therein, as shown in Figure 1. The casing has the usual ports 6 and 7 respectively for the inlet and outlet pipes of the system.

The pair of glands 5 are apertured to receive the reduced portions 8 of the turning plug 4 and shoulder bearings 9 are formed between the turning plug and the glands to hold said plug in operative position and against axial displacement.

A pair of packing chambers are formed continuous with the aforesaid central chamber to receive the pair of expansible U-shaped packings 10 of leather, rubber, or fabric, and said packings are located to position the grooves 11 thereof to receive fluid pressure from the inlet port 6 of the valve through the pair of apertures 12 formed in the casing as shown in Figure 1.

The valve casing 3 may be constructed as a two-way, three-way, or four-way valve as desired. To this end the turning plug 4 is provided with one or more passageways 13 as required.

The auxiliary or additional balancing feature of the valve, and which characterizes this construction, consists of suitable channel-ways 14 in the valve casing 3 adjacent the outlet 7 thereof or opposite to the pilot port (6). Said channel-ways are constructed to communicate with a pair of complementary ducts or channel-ways 15 formed in the turning plug and said ducts have similar outlet passages 16 converging to a common discharge recess 17 formed on the diametrically opposite side of the turning plug (see Figure 5).

In operation the two packing rings 10 are spread through the influence of the pressure in the fluid supply, and thereby substantially perfect fluid-tight joints are provided between the valve casing and the turning plug. It will also be seen that any leaking from the inlet port along the body of the plug will be balanced by pressure from the packing chamber. The pressure medium within the two annular channels 11 will enter the ducts 14 thence pass into and through the communicating grooves 15, 16, and 17 of the turning plug as shown. And according to the angular position of the turning plug this pressure will be directed to the source of supply or against the inner wall of the casing. In the latter case it will be noticed that the plug is turned into closed position or in other words, that the recess (17) does not register with the inlet port (6). Consequently, fluid pressure will then proceed from the inlet port (6) through apertures (12), annular channels (11), ducts (14), slits (15), passages (16) and recess (17), and spread out on the surface of the plug opposite to that of the slits (15), where pressure is created from the ducts (14).

The characteristic feature of the invention resides primarily in the provision and arrangement of the ports 15, 16, and 17 in the valve plug that cooperate with the ports 14 of the valve casing to the end that the pressure at the inlet port 6 is maintained substantially uniform against all points of the valve turning plug. And it will be further evident that this desirable result is obtained notwithstanding the angular position of the turning plug within an appreciably wide range of positions of said turning plug.

It is obvious that those skilled in the art may vary the details of construction and arrangement of parts without departing from the spirit of my invention, and therefore I do not wish to be limited to such features except as may be required by the claims.

Having thus fully described my said invention, what I claim as new and desire to secure by Letters Patent is:—

1. In a balanced valve, the combination of a casing having inlet and outlet ports, glands in said casing providing packing chambers, a plug working in said glands and casing, and expansible packings in said packing chambers, said casing constructed with main apertures leading from the inlet port thereof into the packing chambers and auxiliary apertures leading from said chambers and communicating with slits formed in the plug, said slits communicating with a recess formed in the plug on the opposite side to said slits, substantially as set forth.

2. In a balanced valve the combination of a casing having a smooth bored central chamber and inlet and outlet ports communicating therewith, a plug operable in said chamber and provided with passage-ways adapted to selectively connect said ports when the plug is in open position and to close the ports when in closed position, grooved packings in the casing adjacent the ends of the plug, a recess being formed along the surface of the plug, slits on the opposite side to said recess and communicating channels between the slits and the recess, the casing being provided with ducts leading from the inlet port to said grooves and other ducts leading from the grooves to the slits, whereby a balanced pressure on opposite faces of the plug is created whether the same is in open or closed position, substantially as set forth.

3. In a balanced valve the combination of a casing having inlet and outlet ports and constructed with a central chamber and having opposed recesses, glands fitting in said recesses and forming packing chambers, a turning plug fitting in said glands and the casing chamber, and U-shaped flexible packings fitting in said packing chambers, said casing constructed with main apertures admitting fluid pressure from the inlet port of the valve into the grooves of the packings and forming fluid-tight joints, and auxiliary apertures formed in the casing leading from said packing chambers into slits formed in the plug, said slits communicating with ducts leading to a recess formed on the surface of the plug, substantially as set forth.

4. In a balanced valve, the combination of a casing having a central chamber and a plug working therein, said casing having inlet and outlet ports directed to the central chamber and the plug having passage-ways adapted to communicate with said ports; pressure chambers being formed at opposite ends of the casing and provided with main and auxiliary apertures, the main apertures communicating with said inlet port and the auxiliary apertures communicating with the central chamber; slits being provided on one side of the plug, a recess on the opposite side and channels connecting said recess and slits, said recess being adapted to register with the inlet port when the slits register with said auxiliary apertures to establish inter-communication between the pressure chambers and the inlet port, thereby creating a counter-pressure in said central chamber on the opposite side to the inlet port, substantially as set forth.

5. In a balanced valve, the combination of a casing having a central chamber and a plug working therein, said casing having inlet and outlet ports directed to the central chamber and the plug having passage ways adapted to communicate with said ports; pressure chambers being formed at opposite ends of the casing and provided with main and auxiliary apertures, the main apertures communicating with said inlet port and the auxiliary apertures communicating with the central chamber; slits being provided on one side of the plug and directed substantially perpendicularly of the axis of the plug, a recess on the opposite side and converging channels connecting said recess and slits, said recess being adapted to register with the inlet port when the slits register with said auxiliary apertures to establish inter-communication between the pressure chambers and the inlet port, thereby creating a counter-pressure in said central chamber on the opposite side to the inlet port, substantially as set forth.

6. In a balanced valve, the combination of a casing having a central chamber and a plug working therein, said casing having inlet and outlet ports directed to the central chamber and the plug having passage ways adapted to communicate with said ports; pressure chambers being formed at opposite ends of the casing and provided with main and auxiliary apertures, the main apertures communicating with said inlet port and the auxiliary apertures communicating with the central chamber; slits being provided on one side of the plug, a recess on the opposite side and channels connecting said recess and slits, said recess being adapted to register with the inlet port when the slits register with said auxiliary apertures to establish inter-communication between the pressure chambers and the inlet port, thereby creating a counter-pressure in said central chamber on the opposite side to the inlet port, and grooved packings inserted in said chambers, whereby said packings become expanded by the fluid pressure from the inlet port when entering said grooves by the cooperation of the enumerated connections, substantially as set forth.

In witness whereof, I have hereunto set my hand at Florin, Pennsylvania, this 19" day of February, A. D. nineteen hundred and twenty-six.

NICHOLAS U. PERIS.